United States Patent
Maalouli et al.

(10) Patent No.: US 7,561,864 B2
(45) Date of Patent: Jul. 14, 2009

(54) RF RECEIVER WITH NLMS CHANNEL ESTIMATOR AND METHOD THEREFOR

(75) Inventors: Ghassan Chehade Maalouli, Scottsdale, AZ (US); Justin Lamar Allen, Mesa, AZ (US); Keith Charles Palermo, Higley, AZ (US)

(73) Assignee: General Dynamics C4 Systems, Inc., Scottsdale, AZ (US)

( * ) Notice: Subject to any disclaimer, the term of this patent is extended or adjusted under 35 U.S.C. 154(b) by 429 days.

(21) Appl. No.: 11/566,222

(22) Filed: Dec. 3, 2006

(65) Prior Publication Data

US 2008/0130807 A1 Jun. 5, 2008

(51) Int. Cl.
*H04B 1/10* (2006.01)

(52) U.S. Cl. .................... 455/286; 455/67.13; 455/296; 455/310

(58) Field of Classification Search .................... 455/39, 455/67.11, 67.13, 130, 226.1, 286, 296, 306, 455/310, 341
See application file for complete search history.

(56) References Cited

U.S. PATENT DOCUMENTS

| | | | |
|---|---|---|---|
| 5,278,870 A | 1/1994 | Mays et al. | |
| 5,303,263 A | 4/1994 | Shoji et al. | |
| 6,014,372 A * | 1/2000 | Kent et al. | 370/316 |
| 6,633,551 B1 * | 10/2003 | Kent et al. | 370/316 |
| 6,658,047 B1 | 12/2003 | Komulainen et al. | |

OTHER PUBLICATIONS

M. N. Maslin, "High Data Rate Transmission Over HF Links," Radio Electron. Eng., vol. 52, pp. 75-87, Feb. 1982.
B. Goldberg, "300 kHz—300 MHz MF/HF," IEEE Trans. Commun. Technol., vol. COM-14, pp. 767-784, Dec. 1960.
P. K. Shukla & L. F. Turner, "Channel-Estimation-Based Adaptive DFE for Fading Multipath Radio Channels," IEE Proceedings-1, vol. 138, No. 6, pp. 525-543, Dec. 1991.
S. Haykin, "Adaptive Filter Theory," 4th Edition, Prentice Hall, pp. 352-356, 2001.

(Continued)

*Primary Examiner*—Tony T Nguyen
(74) *Attorney, Agent, or Firm*—Lowell W. Gresham; Jordan M. Meschkow; Gouri G. Nair (57) ABSTRACT

An RF receiver (12) includes a channel estimator (52). The channel estimator (52) includes a channel estimation filter (82), error signal generator (84), and normalized Least-Mean-Square (NLMS) filter-definition generator 86. The filter (82), error generator (84) and NLMS filter-definition generator (86) function together as an adaptive estimator. An error signal (90) is formed with a received signal (48). The filter (82) filters an estimated transmit signal (74) constructed from lower confidence decision data (66) and higher confidence known preamble data (30"). An adaptive filter definition (94) is formed in a feedback, loop which minimizes correlation between the estimated transmit signal (74) and the error signal (90). A convergence signal (122) is modulated in synchronism with the changes between lower and higher confidence data in the estimated transmit signal (74).

21 Claims, 4 Drawing Sheets

OTHER PUBLICATIONS

R. Otnes, "Improved Receivers for Digital High Frequency Communications: . . . ," Ph.D. Dissertation, Norwegian Univ. of Sci. & Tech, pp. 1-32 & 71-154, 2002.

J. R. Treichler, C. R. Johnson Jr., M.G. Larimore, "Theory and Design of Adaptive Filters," John Wiley & Sons, pp. 279-292, 1987.

B.A. Bjerke, J.G. Proakis, K.Y.M. Lee, Z.Zvonar, "A comparison of GSM Receivers for Fading Multipath Channels . . . ," IEEE Journ. On S. Areas In Comm., vol. 18, No. 6, Nov. 2000.

A. Sayed, "Fundamentals of Adaptive Filtering," Wiley Press, 2003, pp. 300-305, 367-372, 421-423, 471-474, and 524-525.

* cited by examiner

RF RECEIVER WITH NLMS CHANNEL ESTIMATOR AND METHOD THEREFOR

GOVERNMENT RIGHTS

This invention was made with Government support under N00039-04-C0022 awarded by the Navy. The Government has certain rights in this invention.

TECHNICAL FIELD OF THE INVENTION

The present invention relates generally to the field of radio-frequency (RF) communications. More specifically, the present invention relates to RF receivers which provide adaptive equalization based on an estimate of channel characteristics.

BACKGROUND OF THE INVENTION

The high-frequency (HF) band, which extends from 3 MHz to 30 MHz, provides a unique environment within which to engage in data communications. This band provides a highly desirable environment for long-haul communications where RF signals need to propagate from a transmitter over the horizon, In the HF band, communication is not limited to line-of-sight applications because a large portion of the energy in an HF signal is reflected by the ionosphere back to the earth and by the earth back to the ionosphere. A receiver located beyond the horizon from a transmitter receives an HF signal because the HF signal bounces between the ionosphere and the earth until it reaches the receiver.

But the HF band also provides a particularly harsh environment within which to engage in data communications. As a result, conventional data communication systems have been limited to transmitting over only lower data rate channels, typically less than 9600 baud, and over channels that have been notoriously unreliable.

Multipath can foe particularly severe when compared to communications in higher frequency bands. Multipath results from different portions of a transmitted wireless RF signal propagating along different paths to the receiver, causing a signal which is broadcast at a precise instant in time to foe received spread over a period of time. In the HF environment, the shortest path may foe a direct line-of-sight path or a single reflection off the ionosphere, and longer paths may result from numerous reflections between the ionosphere and the earth. As a result, a typical multipath scenario in the HF band causes interference, including intersymbol interference (ISI) and other types of interference, over a very large duration of 2-8 ms.

And, the ionosphere is constantly changing to provide other deleterious effects. For example, a few hertz of Doppler is often present in a received HF signal. And, the changing ionosphere changes the nature of HF signal reflections from the ionosphere, causing severe fading, both by itself and through the continually changing nature of multipath.

Conventional receivers intended to receive HF signals have included an equalizer to combat the severe multipath and fading characteristics of the HF channel. One particularly desirable technique uses a decision feedback equalizer (DFE) to filter a baseband form of the received signal. But the DFE must be told how to equalize the received signal to compensate for the HF channel. In order to determine how to equalize the received signal, a channel estimation filter structure is used to estimate channel characteristics, and from the estimates generated by the channel estimation filter the DFE is told how to equalize the received signal. In other words, the multipath and fade characteristics of the channel are modeled as a filter, and when a filter definition that models the channel is determined, that filter definition is mapped into DFE coefficients.

The channel estimation filter operates in accordance with an adaptation algorithm which causes the channel estimation filter to function as an adaptive estimator. But conventional channel estimation techniques have failed to adequately estimate HF channels, resulting in unreliable communications and/or communications at undesirably low data rates or undesirably poor bit error rates (BER).

One conventional channel estimation filter technique uses a Least-Mean-Square (LMS) adaptation algorithm. But the LMS adaptation algorithm is slow to converge and does a poor job of tracking time-varying HF channels. Even when preambles embedded within a transmitted data stream are undesirably long, the LMS adaptation algorithm can fail to converge altogether. Excessively long preambles are undesirable because they lead to slower data communication rates, ail other parameters remaining constant. Accordingly, the poor convergence speed and tracking ability of the LMS adaptation algorithm cause conventional channel estimation filters to make poor estimates of the HF channel characteristics, which causes the DFE to be improperly told how to equalize the received signal, which results in poor performance.

Another conventional channel estimation filter technique uses a Recursive Least-Squares (RLS) adaptation algorithm. The RLS algorithm improves upon the LMS algorithm for the HF channel estimation application because it can achieve a fast convergence. But it still suffers from a poor ability to track the time-varying HF channel. And, its ability to achieve a fast convergence comes at a high cost in computational complexity and in sensitivity to numerical instability. Due to the poor ability to track the time-varying HF channel, the RLS adaptation algorithm causes conventional channel estimation filters to make poor estimates of the HF channel characteristics, which causes the DFE to be improperly told how to equalize the received signal, which results in poor performance. And, the computational complexity has been so great as to cause the algorithm to be implemented in dedicated hardware rather than software programming in a digital signal processor (DSP) or like programmable device, causing increased development costs, increased manufacturing costs, and increased power consumption. The computational complexity has also precluded implementation of an RLS adaptation algorithm in a software-defined radio (SDR).

SUMMARY OF THE INVENTION

It is an advantage of one embodiment of the present invention that an improved RF receiver which has a normalized Least-Mean-Square (NLMS) channel estimator and associated method is provided.

Another advantage of one embodiment of the present invention is that an RF receiver is provided which is suitable for use in receiving RF signals in the HF band.

Another advantage of one embodiment of the present invention is that an RF receiver with an adaptation algorithm used for estimating channel characteristics applies an NLMS algorithm.

Another advantage of one embodiment of the present invention is that a low-complexity adaptation algorithm for a channel estimator in an RF receiver is provided.

Another advantage of one embodiment of the present invention is that an RF receiver is provided in which a channel estimator is compatible with implementation in a DSP and/or SDR.

Another advantage of one embodiment of the present invention is that an RF receiver is provided in which a channel estimator demonstrates fast convergence.

Another advantage of one embodiment of the present invention is that an RF receiver is provided in which a channel estimator is capable of tracking a time-varying channel.

These and other advantages are realized in one form by an improved RF receiver which estimates characteristics of a channel through which an RF signal propagates prior to being received at the receiver. The receiver includes a downconverter adapted to downconvert the RF signal into a received signal. An estimated-transmit-signal generator is configured to generate an estimated transmit signal. The estimated transmit signal estimates an actual transmit signal used in a transmitter to generate the RF signal. A channel estimation filter has an input adapted to receive the estimated transmit signal and has an output which produces a filtered estimate signal. The channel estimation filter is configured to filter the estimated transmit signal in accordance with an adaptive filter definition, An error signal generator has a first input adapted to receive the filtered estimate signal, a second input adapted to receive the received signal, and an output which produces an error signal. A filter-definition generator has a first input adapted to receive the estimated transmit signal, a second input adapted to receive the error signal, and an output coupled to the channel estimation filter. The filter-definition generator is configured to generate the adaptive filter definition through the application of an NLMS adaptation algorithm so that the adaptive filter definition estimates the characteristics of the channel.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
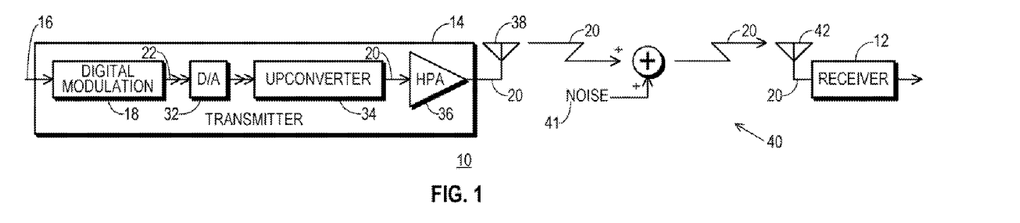
FIG. 1 shows a block diagram, of a communication system which includes an RF receiver configured in accordance with the teaching of the present invention.

FIG. 1 shows a block diagram of a communication system 10 which includes at least an RF receiver 12 and a corresponding transmitter 14 configured in accordance with the teaching of the present invention. In the preferred embodiment, communication system 10 is intended to operate primarily in the high-frequency (HF) band, but this is not a requirement of all embodiments of the present invention. The HF band extends from 3 MHz to 30 MHz, but the preferred embodiment here may also operate down to 2 MHz.

Transmitter 14 receives user-supplied data 16 at a digital modulation section 18. it is the purpose of communication system 10 that user supplied data 16 be transmitted from transmitter 14 to receiver 12 and then passed to a consumer of that data. Digital modulation section 18 adds system data to user-supplied data 16. System data are used by communication system 10 to aid the communication of user-supplied data 16. One form of system data is predetermined data sequences, hereinafter called preambles, which are interspersed with user-supplied data 16. Preambles are included to train or otherwise aid receiver 12 in configuring itself to successfully receive an RF signal 20 transmitted from transmitter 14. Other types of system data may also be added. For example, forward error correction schemes may be implemented which essentially add system data to user-supplied data 16.

Digital modulation section 18 modulates the user-supplied data 16 and system data into a digital baseband communication signal, hereinafter referred to as an actual transmit signal 22. In the preferred embodiment, user-supplied data 16 and the system data are mapped into a complex phase space in a manner well understood to those skilled in the art. Actual transmit signal 22 is typically presented as a stream of complex symbols, with one symbol being formed during each unit interval.

For the example of 8PSK modulation, during each unit interval one symbol is generated, and that one symbol describes one of only eight potential phase states defined between complex in-phase and quadrature-phase components of actual transmit signal 22. The double-headed arrow extending from digital modulation section 18 in FIG. 1, and elsewhere in the Figures, indicates the presence of a complex signal. That one symbol conveys three bits of data, whether user-supplied data 16, system data, or a combination of the two. Of course, those skilled in the art will appreciate that the present invention is not limited to this 8PSK example but that it may be adapted to any of a wide variety of digital modulation types known to those skilled in the art.

Figure 2:
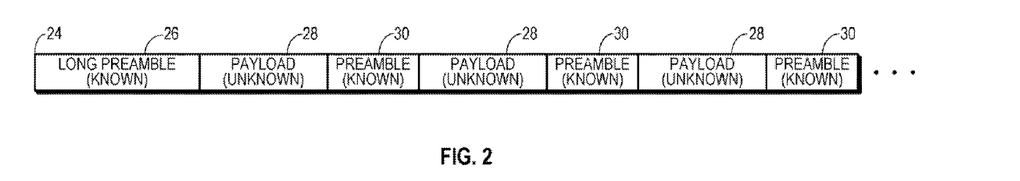
FIG. 2 shows a data format diagram showing types of data included in a transmit signal processed by a transmitter portion of the communication system of FIG. 1.

FIG. 2 shows a data format diagram showing different types of data conveyed by actual transmit signal 22. The beginning of a transmission is denoted at an instant 24. Following instant 24, a long preamble 26 conveys system data that will or can be known to receiver 12 prior to the transmission. Following long preamble 26, actual transmit signal 22 includes alternating portions of payload data 28 and preamble data 30. Payload data 28 and preamble data 30 alternate indefinitely until the end of the transmission.

Payload data 28 is formed from user-supplied data 16 and may also include system data for the purpose of forward error correction. But since payload data 28 is based on user-supplied data 16, it is unknown to receiver 12 until it is received and successfully demodulated. Preamble data 30 are system data that are known to receiver 12 prior to the transmission. Nothing requires precisely the same preamble data to be used during each instance of preamble data 30 in the transmission. But its position and length within the transmission, and its contents are desirably known to receiver 12 prior to transmission.

Long preamble 26 is included so that receiver 12 may adequately synchronize itself to the new transmission prior to the transmission of payload data 28. But preambles 30 are desirably much shorter than long preamble 26. Preambles 30 are included to maintain the already established synchronization and to permit characterization of the channel.

Desirably, preambles 30 are maintained as short as possible so that a given period of time is dedicated to transmitting as much user-supplied data as possible. But nevertheless, a significant amount of actual transmit signal 22 is dedicated to preambles 30 because actual transmit signal 22 is destined, after subsequent processing, to propagate through the harsh environment of an HF channel. Thus, in the preferred embodiment, the ratio of preamble data 30 to payload data 28 is in the range of 0.1 to 1.5. In one embodiment, preamble data 30 may be as short as only 16 symbols long.

Referring back to FIG. 1, actual transmit signal 22 is converted into a complex analog signal in a digital-to-analog section (D/A) 32, then upconverted to RF signal 20 in an upconverter 34. Upconverter 34 shifts the frequency of actual transmit signal 22, now in an analog form, to the HF band, and more preferably to a narrow frequency band in the range of 2 to 30 MHz. RF signal 20 is then amplified in a high power amplifier (HPA) 36 and broadcast from transmitter 14 at an antenna 38.

Transmitter 14 broadcasts RF signal 20 into a channel 40 likely to have harsh characteristics. Channel 40 may have severe multipath and fading characteristics and may impose some Doppler shift on RF signal 20. And, channel 40 is likely to be a time-varying channel, where the characteristics of channel 40 can change considerably over the course of the transmission. Further corruption of RF signal 20 invariably occurs within channel 40 through the addition of noise 41.

Receiver 12 receives RF signal 20, now corrupted by the influences of channel 40, at an antenna 42. It is the job of receiver 12 to accurately determine what user-supplied data 16 was provided to transmitter 14 and to provide such data to a consumer of that data.

Figure 3:
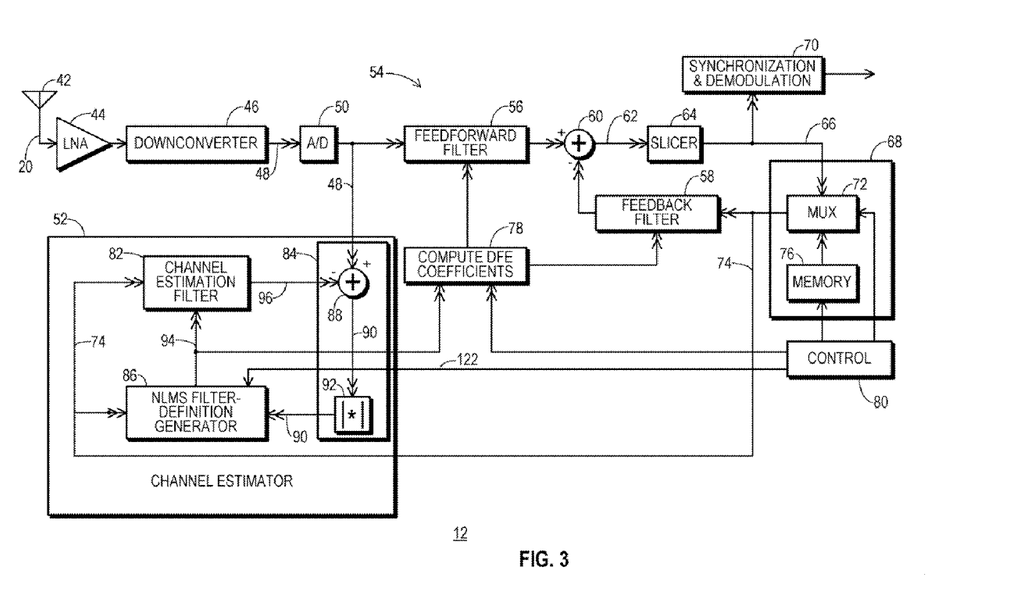
FIG. 3 shows a block diagram of the RF receiver from the communication system of FIG. 1.

FIG. 3 shows a block diagram of RF receiver 12. RF signal 20 is supplied from antenna 42 through a low-noise amplifier (LNA) 44 of RF receiver 12 to a downconverter 46. Downconverter 46 shifts RF signal 20 downwards in frequency, preferably by an amount in the range of 2 to 30 MHz, and more preferably to baseband, to generate a received signal 48. Received signal 48 is converted into a complex digital signal at an analog-to-digital (A/D) section 50. The remaining sections of RF receiver 12 perform digital processing. In the preferred embodiment, the remaining sections are implemented in a Digital Signal Processor (DSP) through the provision of software that implement the functions discussed below and illustrated in the Figures. In one embodiment, RF receiver 12 is included in a software-defined radio (SDR) platform. But those skilled in the art will understand that such functions may be implemented either in software or hardware, or in a combination of software and hardware.

Received signal 48 passes from A/D section 50 to a channel estimator 52 and to a decision feedback equalizer (DFE) structure 54. DFE structure 54 includes a feedforward filter 56 and a feedback filter 58. Received signal 48 passes through feedforward filter 56 to a positive input of a differencing block 60. An output of differencing block 60 generates an equalized-received signal 62 that passes to a slicer 64. During each unit interval, slicer 64 determines which one of the states of the phase constellation used in digital modulation section 18 of transmitter 14 (FIG. 1) is best described by equalized-received signal 62, and outputs a complex phase value that precisely describes that state. That state represents an estimate of the complex phase data described by a corresponding unit interval from actual transmit signal 22 (FIG, 1). Slicer 64 produces a decision signal 66 characterized by a data stream of such phase values.

Decision signal 66 is provided to an estimated-transmit-signal generator 68 and a synchronization and demodulation section 70, Synchronization and demodulation section 70 performs numerous functions conventionally included in digital receivers and not otherwise shown in FIG. 3. For example, section 70 may include functions that aid in frequency and/or phase synchronization with RF signal 20. And, section 70 may include functions that generate data estimates from the phase values conveyed by decision signal 66, In one embodiment, decoders for forward error correction may be included in section 70.

Within estimated-transmit-signal generator 68, decision signal 66 drives a first data input of a multiplexer (MUX) 72. A data output of multiplexer 72 provides an estimated transmit signal 74, which drives an input of feedback filter 58. An output of feedback filter 58 drives a negative input of differencing block 60.

Estimated-transmit-signal generator 68 also includes a memory 76. Memory 76 stores known portions of actual transmit signal 22. In particular, memory 76 stores at least data equivalent to preambles 26 and 30 (FIG. 2). The data is stored in complex phase value form. An output of memory 76 couples to a second data input of multiplexer 72.

A control section 80 is provided by programmable elements of a digital signal processor (DSP), programmable gate array, microcontroller, microprocessor, or like machine. One output of control section 80 couples to an input of memory 76, and another output of control section 80 couples to a selection input of multiplexer 72, Control section 80 is programmed, preferably through software, to cause memory 76 to output appropriate preambles at appropriate times and to control multiplexer 72 to generate such preambles as part of estimated transmit signal 74.

Thus, decision signal 66 provides one estimate of actual transmit signal 22, but estimated transmit signal 74 includes only a portion of decision signal 66 combined with known data, in the form of preambles 30 stored within memory 76. This is discussed in more detail below.

Each of feedforward and feedback filters 56 and 58 included in DFE structure 54 is desirably implemented by a finite impulse response (FIR) filter that applies a filtering transfer function defined by filter coefficients. When the filter coefficients change, the respective transfer functions likewise change. These filter coefficients are provided by a compute DFE coefficients section 78, which maps signals received from channel estimator 52 into such filter coefficients in a manner understood by those skilled in the art. Another output from control section 80 couples to compute DFE coefficients section 78 to provide initialization coefficients used to define DFE structure 54 upon initialization. Preferably, such initialization coefficients describe an ideal channel.

Channel estimator 52 includes a channel estimation filter 82, an error signal generator 84, and a normalized Least-Mean-Square (NLMS) filter-definition generator 86. Received signal 48 drives one input of error signal generator 84. In particular, received signal 48 output from A/D section 50 drives a positive input of a differencing block 88 included within error signal generator 84. An output of differencing block 88 forms an error signal 90, translated into its conjugate in a conjugation block 92, then passed to an input of NLMS filter-definition generator 86. Estimated transmit signal 74 drives inputs of both NLMS filter-definition generator 36 and of channel estimation filter 82. And, one or more control signals are provided to NLMS filter-definition generator 86 from control section 80.

NLMS filter-definition generator 86 generates a continuously updated adaptive filter definition 94 provided to channel estimation filter 82 and to compute DFS coefficients section 78. In order to do this, NLMS filter-definition generator 86 applies an NLMS adaptation algorithm to error signal 90 and to estimated transmit signal 74 to repeatedly revise and update a previous adaptive filter definition 94 so that adaptive filter definition 94 estimates and tracks the characteristics of channel 40. In the preferred embodiment, adaptive filter definition 94 represents a set of coefficients for a FIR filter used to implement channel estimation filter 62. An output of channel estimation filter 82 provides a filtered estimate signal 96 that drives a negative input of differencing block 88.

Figure 4:
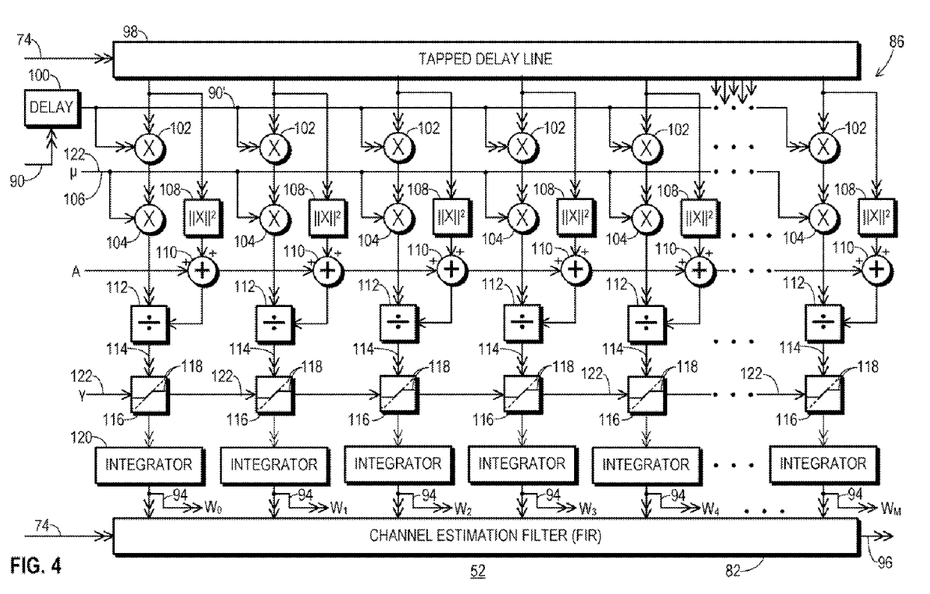
FIG. 4 shows a block diagram of an NLMS filter-definition generator and channel estimation filter from the RF receiver from the communication system of FIG. 1.

FIG. 4 shows a block diagram of the portion of channel estimator 52 that includes NLMS filter-definition generator 86 and channel estimation filter 82. Channel estimation filter 82 is depicted as a FIR filter having "M+1" taps, where M is an integer number. The precise value of M is not particularly relevant, but may be in the range of 5-15 in a typical HF application. Desirably, feedforward filter 56 also has M+1 taps. Estimated transmit signal 74 drives a data input of filter 82, and filter 82 generates filtered estimate signal 96 at a data output. Coefficient inputs $W_D$-$W_N$ to filter 82 collectively provide adaptive filter definition 94. The remainder of the block diagram depicted, in. FIG. 4 is provided by NLMS filter-definition generator 86.

Estimated transmit signal 74 drives a tapped delay line 98 having roughly M+1 taps. Error signal 90 is delayed in a delay element 100 that preferably postpones error signal 90 for about one-half of the maximum tap delay of tapped delay line 98. The taps from tapped delay line 98 drive first inputs of multipliers 102, and a delayed error signal 90' output from delay element 100 drives second inputs of all multipliers 102. Delayed error signal 90' is aligned in time approximately at the center of filter 82 and tapped delay line 98. At the various taps of NLMS filter-definition generator 86, multipliers 102 determine correlation between error signal 90 and estimated transmit signal 74 on a symbol by symbol basis. Thus, adaptive filter definition 94 is proportional to both error signal 90 and estimated transmit signal 74.

Outputs from multipliers 102 are provided to first inputs of corresponding multipliers 104, and an adaptation constant 106, also labeled as "μ", drives second inputs of all multipliers 104. Adaptation constant 106 is provided by control section 80 (FIG. 3). The term "constant" in adaptation constant 106 is used for consistency with conventional usage. As discussed in more detail below, adaptation constant 106 is one form of a convergence signal that is modulated to enhance the performance of channel estimator 52.

Each tap output from tapped delay line 98 also drives a corresponding magnitude block 108 that determines the magnitude of complex estimated transmit signal 74 at that tap. The magnitude values from magnitude blocks 108 are then offset by a small value, such as one least significant bit (LSB) in an addition block 110. This small value is given the label "A" in FIG. 4.

For each tap, an output from multiplier 104 drives a numerator input of a corresponding division block 112, and an output from addition block 110 drives a denominator input of the corresponding division block 112. The output from division block 112 for each tap provides an update 114. In a subsequent cycle, a previous adaptive filter definition 94 is adjusted or adapted by updates 114 to produce a revised adaptive filter definition. It is division block 112 that causes NLMS filter-definition generator 86 to implement a normalized LMS adaptation algorithm rather than a standard LMS adaptation algorithm. The correlation signal is normalized by the magnitude of the estimated transmit signal 74, Accordingly, update 114 is responsive to a mathematical term substantially equal to a ratio of estimated transmit signal 74 divided by the magnitude of estimated transmit signal 74. This normalization factor permits fast convergence. Positive offset "A" is included for mathematical stability by preventing magnitude signal output from magnitude block 108 from exhibiting a value of zero.

For each tap, update 114 drives a variable hard limiter 116. Variable hard limiter 116 prevents the update from exceeding a threshold 118, and threshold 118 may be controlled in response to another form of convergence signal, labeled "γ" in FIG. 4. Threshold 113 limits that amount of change permitted in adaptive filter definition 94 per unit interval of time. A higher threshold 118 permits greater change in adaptive filter definition 94 per unit interval of time, and a lower threshold 118 permits less change in adaptive filter definition 94 per unit interval of time. The convergence signal γ may be provided by control section 80 and modulated as discussed below to enhance the performance of channel estimator 52.

Corresponding outputs from variable hard limiters 116 are provided to integrators 120, Integrators 120 add updates 114 to previously used coefficients to generate new coefficients, and retain the new coefficients for use in the subsequent cycle. Integrators 120 provide adaptive filter definition 94 from NLMS filter-definition generator 86.

Thus, channel estimator 52 and NLMS filter-definition generator 86 implement an adaptation algorithm that may be summarized as follows:

for n=1, 2, . . . .

Step 1: Compute the error:

$e(n)=d(n)-h^H(n)x(n)$

Step 2: Update the channel estimates:

$$h(n+1) = h(n) + \frac{\mu e^*(n)x(n)}{A + \|x(n)\|^2}$$

where, e(n)=error signal 90
d(n)=received signal 48
x(n)=estimated transmit signal 74
h(n)=adaptive filter definition 94
μ=adaptation constant 106
A=a small positive offset Accordingly, positive or negative correlation between error signal 90 and estimated transmit signal 74 causes updates 114 that make adjustments to adaptive filter definition 94 which tend to lessen such correlation in the future. When a minimum amount of correlation between error signal 90 and estimated transmit signal 74 exists, convergence has occurred, and the characteristics of channel 40 have been estimated. Those characteristics are described by adaptive filter definition 94.

The convergence of the NLMS adaptation algorithm discussed above occurs quickly due, at least in part, to normalization of correlation by the magnitude of estimated transmit signal 74. This makes RF receiver 12 well suited for transmission schemes with short preambles and time-varying channels, as are typical of channels in the HF band. Moreover, the NLMS adaptation algorithm discussed above is a low complexity one, making it suitable for software implementation. And, the NLMS adaptation algorithm discussed above does not rely upon extensive processing and is therefore well suited to tracking a time-varying channel, such as a channel in the HF band.

Figure 5:
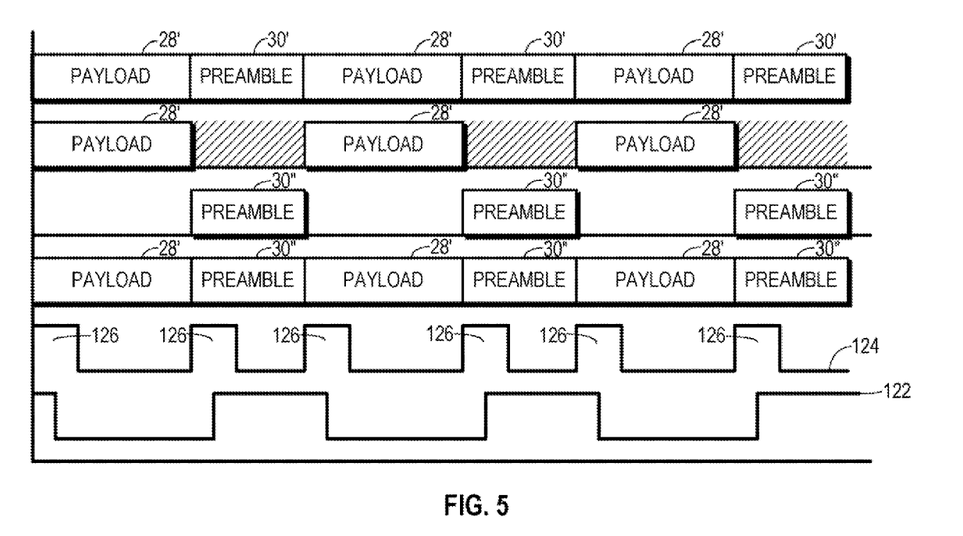
FIG. 5 shows a timing diagram which describes data and events relevant to the operation of the RF receiver from the communication system of FIG. 1.

FIG. 5 shows a timing diagram which describes data and events relevant to the operation of the RF receiver 12. More particularly, FIG. 5 depicts the operation of one or more convergence signals 122 that control section 80 desirably provides to NLMS filter-definition generator 86 to enhance the performance of channel estimator 52.

A top trace in FIG. 5 shows a data format diagram showing different types of data conveyed by decision signal 66 (FIG. 3). In particular, decision signal 66 has alternating periods of payload data 28' and preamble data 30' which correspond to the alternating periods of payload data 28 and preamble data 30 in actual transmit signal 22 (FIGS. 1-2). FIG. 5 omits a corresponding portion for long preamble 26 (FIG. 2) because this discussion is more relevant to the steady-state operation of receiver 12.

Control section 80 and estimated-transmit-signal generator 68 combine payload data estimates 28' from decision signal 66 and known preamble data estimates 30" from memory 76 to form estimated transmit signal 74, Thus, preamble data estimates 30' from decision signal 66 are discarded in estimated transmit signal 74 and replaced by known preamble data estimates 30" from memory 76.

Known preamble data estimates 30" represent higher confidence data estimates than received preamble data 30', which represent lower confidence data estimates. In fact, the level of confidence for known preamble data estimates 30" is substantially certain, So long as transmitter 14 follows preestablished communication rules and receiver 12 is correctly synchronized, known preamble data estimates 30" will be correct. Known preamble data estimates 30" are not responsive to received signal 48. The same cannot be said for lower confidence data obtained from decision signal 66, whether payload data 28' or preamble data 30'. Such lower confidence data are responsive to received signal 48, Noise and distortions introduced into RF signal 20 in channel 40 may have lead to errors in decision signal 66.

Accordingly, estimated transmit signal 74 is configured by estimated-transmit-signal generator 68 so that alternating portions of signal 74 convey relatively higher confidence data estimates (i.e., preamble 30") and relatively lower confidence data estimates (i.e., payload 28'). Performance in channel estimator 52 is enhanced because a significant portion of high confidence data is used in generating adaptive filter definition 94. The discarded portion of decision signal 66 (i.e., preamble 30') is discarded only for the purpose of estimating what signals were actually transmitted through channel 40 by transmitter 14. The entirety of received signal 48 is used by channel estimator 52 in the formation of error signal 90.

In addition, the above-discussed NLMS adaptation algorithm implemented by channel estimator 52 is desirably controlled so that greater credence is given to the higher confidence data estimates (i.e., preamble 30") than is given to the lower confidence data estimates (i.e., payload 28') for purposes of determining channel characteristics. Thus, convergence signal 122 is synchronized to estimated transmit signal 74 so that more channel estimation filter definition change in a predetermined duration results when filtering the higher confidence data estimates and less channel estimation filter definition change in the predetermined duration results when filtering the lower confidence data estimates.

This may be accomplished in either or both of two ways. In one technique, adaptation constant 106 (FIG. 4) may be set to a high level, for example near one, when processing higher confidence data estimates and to a low level, for example a small fraction, when processing lower confidence data estimates. In another technique, threshold 118 (FIG. 4) for variable hard limiter 116 (FIG. 4) may be set to a high level when processing higher confidence data estimates and to a lower level when processing lower confidence data estimates. Performance in channel estimator 52 is further enhanced because, while adaptive filter definition 94 is continuously updated in response to received signal 48, adaptive filter definition 94 is influenced more heavily by the higher confidence preamble data 30" than the payload data 28'.

Moreover, the precise phasing of convergence signal 122 is also controlled by control section 80 in one embodiment to further enhance performance. A trace 124 in FIG. 5 depicts a transition period. 126 which occurs for a period of time after NLMS filter-definition generator 86 begins to process a change in the confidence level of data estimates presented by estimated transmit signal 74. In particular, transition period 126 extends for roughly M+1 symbols after the points where payload data estimates 28' and preamble data estimates 30" are first provided to NLMS filter-definition generator 86. During transition periods 126, tapped delay line 98 holds some higher confidence data estimates and some lower confidence data estimates.

Desirably, convergence signal 122 exhibits a phase relationship with estimated transmit signal 74 so that it changes during transition periods 126, as shown in the bottom trace of FIG. 5. Thus, convergence signal 122 exhibits a state consistent with the majority of data being processed in NLMS filter-definition generator 86.

In summary, at least one embodiment of the present invention provides an improved RF receiver which has an NLMS channel estimator and associated method. At least one embodiment of the present invention provides an RF receiver that is suitable for receiving signals in the HF band. At least one embodiment of the present invention provides an RF receiver that continuously estimates channel characteristics and applies an NLMS adaptation algorithm to do so. At least one embodiment of the present invention uses a low-complexity adaptation algorithm for a channel estimator in an RF receiver. The low complexity of the NLMS algorithm is particularly well suited to implementation in a DSP and/or SDR. In at least one embodiment of the present invention, the NLMS adaptation algorithm demonstrates fast convergence in determining channel characteristics, thereby permitting the use of short preambles. And, in at least one embodiment of the present invention the channel estimator is capable of tracking a time-varying channel.

Although the preferred embodiments of the invention have been illustrated and described in detail, it will be readily apparent to those skilled in the art that various modifications may be made therein without departing from the spirit of the invention or from the scope of the appended claims. For example, while the above-discussed preferred embodiment is particularly beneficial for RF communications in the HF band, the present invention may also be used in other frequency bands. The above-discussed convergence signal need not exhibit only two states and abruptly transition between the two states. These and other changes and modifications which are within the capabilities of those skilled in the art are intended to foe included within the scope of the present invention.

What is claimed is:

1. A method for operating a radio-frequency (RF) receiver which estimates characteristics of a channel through which an RF signal propagates prior to being received at said receiver, said method comprising:

downconverting said RF signal to produce a received signal;

generating an estimated transmit signal, said estimated transmit signal being an estimate of an actual transmit signal used in a transmitter to generate said RF signal;

filtering said estimated transmit signal to produce a filtered estimate signal, said filtering being defined by an adaptive filter definition;

forming an error signal from, said filtered estimate signal and said received signal; and applying a normalized Least-Mean-Square (NLMS) adaptation algorithm to said error signal and to said estimated transmit signal to revise said adaptive filter definition so that said adaptive filter definition estimates said characteristics of said channel.

2. A method as claimed in claim 1 wherein said applying activity comprises forming an update to said adaptive filter definition, said update being responsive to a mathematical term substantially equal to a ratio of said estimated transmit signal divided by the magnitude of said estimated transmit signal.

3. A method as claimed in claim 2 wherein said mathematical term is substantially equal to a ratio of said estimated transmit signal divided by the sum of the magnitude of said estimated transmit signal and an offset.

4. A method as claimed in claim 2 wherein said update is responsive to a convergence signal and proportional to said error signal.

5. A method as claimed in claim 4 wherein:
said received signal and said filtered estimate signal are complex signals; and
said error signal is responsive to the conjugate of the difference between said received signal and said filtered estimate signal.

6. A method as claimed in claim 4 wherein said applying activity is configured so that said convergence signal defines a threshold which limits the amount of change permitted in said adaptive filter definition in a predetermined unit of time.

7. A method as claimed in claim 4 wherein:
said convergence signal is an adaptation constant; and
said applying activity is configured so that said update is proportional to said adaptation constant.

8. A method as claimed in claim 1 wherein said generating activity is configured so that alternating portions of said estimated transmit signal convey relatively higher-confidence-data estimates and relatively lower-confidence-data estimates.

9. A method as claimed in claim 8 wherein said relatively lower-confidence-data estimates portion of said estimated transmit signal is response to said received signal.

10. A method as claimed in claim 8 wherein said relatively higher-confidence-data estimates exhibit a confidence level of substantially certain.

11. A method as claimed in claim 8 wherein a ratio of durations of said relatively higher-confidence-data estimates divided by said relatively lower-confidence-data estimates in said estimated transmit signal is in the range of 0.1 to 1.5.

12. A method as claimed in claim 8 wherein:
said NLMS adaptation algorithm is responsive to a convergence signal; and
said convergence signal is synchronized to said estimated transmit signal so that relatively more filter definition change in a predetermined duration results when filtering said higher-confidence-data estimates and relatively less filter definition change in said predetermined duration results when filtering said lower-confidence-data estimates.

13. A method as claimed in claim 12 wherein:
said filtering activity is performed by a filter that, for a transition period which occurs after said estimated transmit signal changes between said relatively higher-confidence-data estimates and relatively lower-confidence-data estimates, processes both said relatively higher-confidence-data estimates and relatively lower-confidence-data estimates; and
said convergence signal changes during said transition period.

14. A method as claimed in claim 1 wherein said downconverting activity is configured so that said received signal exhibits a frequency in the range of 2.0 to 30 MHz less than the frequency of said RF signal.

15. A radio-frequency (RF) receiver which estimates characteristics of a channel through which an RF signal propagates prior to being received at said receiver, said receiver comprising:
a downconverter adapted to downconvert said RF signal into a received signal;
an estimated-transmit-signal generator configured to generate an estimated transmit signal which estimates an actual transmit signal used in a transmitter to generate said RF signal;
a channel estimation filter having an input adapted to receive said estimated transmit signal and having an output which produces a filtered estimate signal, said channel estimation filter being configured to filter said estimated transmit signal in accordance with an adaptive filter definition;
an error signal generator having a first input adapted to receive said filtered estimate signal, a second input adapted to receive said received signal, and an output which produces an error signal; and
a filter-definition generator having a first input adapted to receive said estimated transmit signal, a second input adapted to receive said error signal, and an output coupled to said channel estimation filter, said filter-definition generator being configured to generate said adaptive filter definition through the application of a normalized Least-Mean-Square (NLMS) adaptation algorithm so that said adaptive filter definition estimates said characteristics of said channel.

16. An RF receiver as claimed in claim 15 wherein said filter-definition generator is configured so that said adaptive filter definition is responsive to a mathematical term substantially equal to a ratio of said estimated transmit signal divided by the magnitude of said estimated transmit signal.

17. An RF receiver as claimed in claim 15 wherein said downconverting activity is configured so that said received signal exhibits a frequency in the range of 2.0 to 30 MHz less than the frequency of said RF signal.

18. An RF receiver as claimed in claim 15 wherein said estimated-transmit-signal generator is configured so that alternating portions of said estimated transmit signal convey relatively higher-confidence-data estimates and relatively lower-confidence-data estimates.

19. An RF receiver as claimed in claim 18 wherein:
said relatively lower-confidence-data estimates portion of said estimated transmit signal is responsive to data conveyed by said received signal; and
said relatively higher-confidence-data estimates portion of said estimated transmit signal is not responsive to data conveyed by said received signal.

20. An RF receiver as claimed in claim 15 wherein:
said NLMS adaptation algorithm is responsive to a convergence signal; and
said convergence signal is synchronized to said estimated transmit signal so that relatively more filter definition change in a predetermined duration results when filtering said higher-confidence-data estimates and relatively less filter definition change in said predetermined duration results when filtering said lower-confidence-data estimates.

21. A radio-frequency (RF) receiver which estimates characteristics of a channel through which a high-frequency (HF) band RF signal propagates prior to being received at said receiver, said receiver comprising:

a downconverter adapted to downconvert said RF signal into a received signal;

an estimated-transmit-signal generator configured to generate an estimated transmit signal which estimates an actual transmit signal used in a transmitter to generate said HF band RF signal, said estimated-transmit-signal generator being configured so that alternating portions of said estimated transmit signal convey relatively higher-confidence-data estimates and relatively lower-confidence-data estimates, said relatively lower-confidence-data estimates portion of said estimated transmit signal is responsive to data conveyed by said received signal, and said relatively higher-confidence-data estimates portion of said estimated transmit signal is not responsive to data conveyed by said received signal;

a channel estimation filter having an input adapted to receive said estimated transmit signal and having an output which produces a filtered estimate signal, said filter being configured to filter said estimated transmit signal in accordance with an adaptive filter definition;

an error signal generator having a first input adapted to receive said filtered estimate signal, a second input adapted to receive said received signal, and an output which produces an error signal; and a filter-definition generator having a first input adapted to receive said estimated transmit signal, a second input adapted to receive said error signal, and an output coupled to said filter, said filter-definition generator being configured to generate said adaptive filter definition through the application of a normalized Least-Mean-Square (NLMS) adaptation algorithm so that said adaptive filter definition estimates said characteristics of said channel, wherein:

said NLMS adaptation algorithm generates an update that is proportional to a mathematical term substantially equal to a ratio of said estimated transmit signal divided by the magnitude of said estimated, transmit signal, is proportional to said error signal, and is responsive to a convergence signal, said convergence signal being synchronized to said estimated transmit signal so that relatively more filter definition change in a predetermined duration results when filtering said higher-confidence-data estimates and relatively less filter definition change in said predetermined duration results when filtering said lower-confidence-data estimates.

* * * * *